United States Patent
Nam et al.

(10) Patent No.: US 7,402,294 B2
(45) Date of Patent: Jul. 22, 2008

(54) CATALYST FOR PARTIAL OXIDATION REFORMING OF FUEL AND FUEL REFORMING APPARATUS AND METHOD USING THE CATALYST

(75) Inventors: Suk-Woo Nam, Seoul (KR); Sang Jun Kong, Seoul (KR); Seong-Ahn Hong, Seoul (KR); In-Hwan Oh, Seoul (KR); Tae-Hoon Lim, Seoul (KR); Heung Yong Ha, Seoul (KR); Sung Pil Yoon, Seoul (KR); Jonghee Han, Seoul (KR); Eun Ae Cho, Seoul (KR)

(73) Assignee: Korea Institute of Science & Technology, Seoul (KR)

(*) Notice: Subject to any disclaimer, the term of this patent is extended or adjusted under 35 U.S.C. 154(b) by 0 days.

(21) Appl. No.: 11/601,366

(22) Filed: Nov. 16, 2006

(65) Prior Publication Data

US 2007/0065358 A1 Mar. 22, 2007

Related U.S. Application Data

(62) Division of application No. 11/010,808, filed on Dec. 13, 2004, now Pat. No. 7,271,127.

(30) Foreign Application Priority Data

Aug. 19, 2004 (KR) .......................... 10-2004-65474

(51) Int. Cl.
C01B 3/26 (2006.01)

(52) U.S. Cl. ...................................... 423/351; 252/373

(58) Field of Classification Search .............. 423/651; 252/373

See application file for complete search history.

(56) References Cited

U.S. PATENT DOCUMENTS

| | | | | |
|---|---|---|---|---|
| 4,597,773 A | * | 7/1986 | Quintana et al. | 48/197 R |
| 4,833,171 A | * | 5/1989 | Sweeney | 518/703 |
| 5,942,346 A | * | 8/1999 | Ahmed et al. | 429/20 |
| 6,733,692 B2 | * | 5/2004 | Dindi et al. | 252/373 |
| 6,783,749 B2 | * | 8/2004 | Narasimhan et al. | 423/648.1 |

(Continued)

OTHER PUBLICATIONS

Dissanayake et al., "Are the Equilibrium Concentrations of Co and $H_2$ Exceeded during the Oxidation of $CH_4$ over a $Ni/Yb_2O_3$ Catalyst?" *J. Phys. Chem*, (1993), vol. 97, pp. 3644-3646, no month.

Prettre et al., "The Catalytic Oxidation of Methane to Carbon Monoxide and Hydrogen." (1946), pp. 335-340, no month.

(Continued)

*Primary Examiner*—Wayne A. Langel
(74) *Attorney, Agent, or Firm*—Merchant & Gould P.C.

(57) ABSTRACT

Disclosed is a catalyst for a partial oxidation reforming reaction of fuel in the form of disk having through-hole. In addition, according to the invention, there is provided a fuel reforming apparatus and method using the catalyst. The catalyst for a partial oxidation reforming reaction of fuel according to the invention makes it possible to progress the partial oxidation reforming reaction of fuel smoothly, to improve the efficiency when reforming the fuel and to simplify the fuel reforming reactor. According to the fuel reforming apparatus and method, since the heat of reaction is efficiently controlled and used, a simple on-off operation, reduction of starting time and a stable operational condition are accomplished, which are indispensably required for a fuel reforming system in fuel cells, such as household, portable and car fuel cells.

6 Claims, 4 Drawing Sheets

U.S. PATENT DOCUMENTS

| | | | |
|---|---|---|---|
| 6,800,269 B2* | 10/2004 | Keller et al. | 423/576.2 |
| 6,887,456 B2* | 5/2005 | Xu et al. | 423/651 |
| 2002/0035036 A1* | 3/2002 | Figueroa et al. | 502/328 |
| 2002/0110521 A1* | 8/2002 | Keller et al. | 423/651 |
| 2002/0119091 A1* | 8/2002 | Keller | 423/576.8 |
| 2004/0120888 A1* | 6/2004 | Jiang et al. | 423/651 |
| 2005/0096215 A1* | 5/2005 | Espinoza et al. | 502/302 |
| 2006/0045844 A1* | 3/2006 | Tamhankar et al. | 423/651 |

OTHER PUBLICATIONS

Yoon, et al., "Operating Characteristics of Integrated NG Reformer System for 5 kW Class PEM Fuel Cell." *Hwahak Konghak*, (2003), vol. 41(No. 3), pp. 389-396, no month.

Ahmed et al., "Demonstration of LPG-fueled solid oxide fuel cell systems." *Solid State Ionics*, (2002), vol. 152-153, pp. 485-492, no month.

Moon et al., "Studies of gasoline fuel processor system for fuel-cell powered vehicles application." *Applied Catalysis A: General*, (2001), vol. 215, pp. 1-9, no month.

* cited by examiner

CATALYST FOR PARTIAL OXIDATION REFORMING OF FUEL AND FUEL REFORMING APPARATUS AND METHOD USING THE CATALYST

This application is a division of U.S. application Ser. No. 11/010,808 filed on Dec. 13, 2004, now U.S. Pat. No. 7,271,127 which claims priority to Korean Application 10-2004-65474 filed on Aug. 19, 2004 which applications are incorporated herein by reference.

BACKGROUND OF THE INVENTION

1. Field of the Invention

The present invention relates to catalyst for a fuel reforming reaction in a fuel cell, and fuel reforming apparatus and method using the same, particularly to catalyst for a partial oxidation reforming reaction of fuel and fuel reforming apparatus and method using the same, which are suitable for a fuel reforming system.

2. Description of the Related Art

Since a fuel cell exhibits a very excellent efficiency and exhausts little pollutional material, compared to an internal-combustion engine, researches on the fuel cell have been constantly carried out. However, a fuel reforming system (fuel processor) capable of stably supplying hydrogen-rich gas, which is fuel required for the fuel cell, is necessary to be developed.

In the fuel reforming system, main reactions, particularly when using methane are as follow:

$$CH_4 + H_2O \rightarrow CO + 3H_2, \Delta H_{298} = 206 \text{ kJ/mol} \quad \text{<Chemical formula 1>}$$

$$CH_4 + 1/2O_2 \rightarrow CO + 2H_2, \Delta H_{298} = -36 \text{ kJ/mol} \quad \text{<Chemical formula 2>}$$

The chemical formula 1 is a steam reforming (SR) reaction, which is widely commercialized. This reaction exhibits relatively high yield of hydrogen and stability. However, since the reaction is highly endothermic, large amounts of heat should be supplied from the outside. In addition, the apparatus becomes large because conversion rate is limited and reaction rate is slow.

The chemical formula 2 is a partial oxidation (POX) reaction of methane, which is fuel for fuel cell. Since this reaction is exothermic, heat supply is minimized and the reaction rate is fast compared to the steam reforming reaction. Further, the size of apparatus becomes small and the conversion rate becomes high. However, there is a possibility of explosion and the yield of hydrogen is reduced when using the air as oxygen source.

As a reaction occurring in the fuel reforming system in addition to the above reactions, there is an auto thermal reforming (ATR) [or partial oxidation reforming (POR)] reaction in which the steam reforming reaction and the partial oxidation reaction occurs simultaneously.

Recently, in order to develop a small fuel reforming system required for a mobile fuel cell, methods using a partial oxidation reforming reaction, which has reasonably fast reaction rate and response, have been researched.

Main reaction paths suggested as mechanism of the partial oxidation reforming reaction are as follow:

Chemical formulas 3 to 5 show each reaction stage of the partial oxidation reforming reaction.

$$CH_4 + 2O_2 \rightarrow CO_2 + 2H_2O \text{ (first stage)} \quad \text{<Chemical formula 3>}$$

$$CH_4 + H_2O \rightarrow CO + 3H_2 \text{ (second stage)} \quad \text{<Chemical formula 4>}$$

$$CH_4 + CO_2 \rightarrow 2CO + 2H_2 \text{ (third stage)} \quad \text{<Chemical formula 5>}$$

The chemical formula 3 shows that methane reacts with $O_2$ and thus is converted completely into $CO_2$ and $H_2O$ in a short time.

The chemical formulas 4 and 5 show that $CO_2$ and $H_2O$ produced in the chemical formula 3 reacts with the remaining methane [Dissanayake, D., Rosynek, M. P. and Lusford, J. H., J. Phys. Chem., 97, 3644-3646 (1993); Prettre, M., Eichner, C. and Perri, M., Trans. Faraday Soc., 43, 335-340 (1946)].

In the partial oxidation reforming reaction, a highly exothermic reaction occurs in a moment at the early stage and then the reforming reaction, which is endothermic, occurs slowly.

Meanwhile, catalyst in the prior reforming reaction system has been in the form of powder. Further, catalyst in the form of powder is coated to a structure which is compression-molded in the form of pellet or monolith [Wang Rae Yoon, et al., HWAHAK KONGHAK, 41(3), 389-396 (2003); Dong Ju Moon, et al., Appl. Catal. A, 215, 1-9 (2001); Ahmed, K., et al., Solid State Ionics, 152-153, 485-492 (2002)].

However, in the partial oxidation reforming reactions of fuel as described above, when catalyst in the form of powder, etc. is used, pressure drop which occurs in the powder catalyst bed in operating a fuel reforming system, should be considered and controlled. When catalyst in the form of pellet or monolith is used, it is difficult to control heat of reaction when the reaction occurs.

Accordingly, the prior fuel reforming system has the problems that it is difficult to simplify a reactor, to obtain a fast starting time and to carry out a stable operation.

SUMMARY OF THE INVENTION

Accordingly, the present invention has been made to solve the above-mentioned problems occurring in the prior art.

The object of the present invention is to provide catalyst for a partial oxidation reforming reaction of fuel capable of progressing the partial oxidation reforming reaction of fuel smoothly, improving the efficiency when reforming the fuel, and simplifying a fuel reforming reactor, contrary to the prior catalyst.

The other object of the invention is to provide fuel reforming apparatus and method using the catalyst, wherein a fuel reforming reactor has a simple structure, a simple on-off operation, reduction of start-up time and a stable operational condition are accomplished, and thus the apparatus and method can be used efficiently for fuel cells such as household, portable and car fuel cells, contrary to the fuel reforming apparatus and method using the prior catalyst.

In order to accomplish the objects, there is provided a catalyst for a partial oxidation reforming reaction of fuel being shaped to have through-hole.

In the catalyst according to the present invention, the catalyst is in the form of a disk having through-hole.

In the catalyst according to the present invention, the catalyst comprises porous nickel-based alloy.

In the catalyst according to the present invention, the catalyst comprises a catalyst main body in the form of porous disk having through-hole, an active material and a cocatalyst which are coated on the catalyst main body.

In order to accomplish the objects, there is provided a fuel reforming apparatus comprising: (a) the fuel reforming reactor including a catalyst or a stack of the catalyst mounted in the reactor, the catalyst being in the form of disk having through-hole; (b) an igniter for generating an electric spark at an interior of the through-hole; and (c) a gas supply line for supplying fuel and air to the interior of the through-hole.

In the fuel reforming apparatus according to the present invention, the igniter is an electrode extending from the inside to the outside of the fuel reforming reactor, the electrode is connected to an electric accumulation device in the outside of the fuel reforming reactor and an end of the electrode which is inserted into the through-hole is provided with an electric spark-generating part.

In the fuel reforming apparatus according to the present invention, the electrode is surrounded by an insulator so that electric spark is generated at the interior of the through-hole.

In the fuel reforming apparatus according to the present invention, the gas supply line consists of a fuel supply line, and a supply line for supplying air alone or mixed gas of air and fuel, which is different from the fuel supply line, or consists of only a supply line for supplying mixed gas of air and fuel without the fuel supply line.

In the fuel reforming apparatus according to the present invention, the fuel supply line supplies the fuel to the interior of the through-hole via the inside of the insulator, and the supply line for supplying air alone or mixed gas of air and fuel supplies the air alone or the mixed gas of air and fuel to the interior of the through-hole via the outside of the insulator.

In the fuel reforming apparatus according to the present invention, the fuel reforming reactor further comprises a member for preventing a reverse progress of the spark, which is in an upstream part of the fuel reforming reactor. Further, the member is preferably a metal fiber mat.

In the fuel reforming apparatus according to the present invention, a metal screen is inserted between the respective catalyst in the stack of the catalyst to form gas channel.

In the fuel reforming apparatus according to the present invention, the apparatus further comprises a heat exchanger carrying out heat exchange between produced gas discharged at an outlet and reforming gas supplied into the fuel reforming reactor, and preheating the reforming gas before the reforming gas is supplied into the fuel reforming reactor.

In order to accomplish the objects, there is provided a fuel reforming method comprising steps of: providing a catalyst or a stack of the catalyst, the catalyst being in the form of disk having through-hole, to a fuel reforming reactor (S1); separately supplying fuel and air in order not to be mixed with each other into the through-hole (S2); starting a fuel reforming reaction in the reactor by generating electric spark in the through-hole (S3); and carrying out a fuel reforming reaction by supplying the reforming gas of fuel and air to the catalyst or the stack of the catalyst in the reactor when a fuel reforming reaction reaches a fuel reforming condition (S4).

In the fuel reforming method according to the present invention, in the step of S2, the fuel is supplied after the supply of air in order not to be mixed with the air during supplying the fuel, and then the fuel and the air are mixed in the through-hole in which the electric spark is generated.

In the fuel reforming apparatus according to the present invention, in the step of S3, the electric spark is generated in the through-hole using an electric accumulation device.

In the fuel reforming apparatus according to the present invention, in the step of S4, the reforming gas of fuel and air are spread out from the interior of the through-hole to the exterior of the through-hole, and radially spread out on the surface of the catalyst or the stack of the catalyst.

In the fuel reforming apparatus according to the present invention, the method further comprises step of preheating reforming gas, which is supplied when a fuel reforming reaction occurs, through heat exchange with produced gases discharged (S5).

DETAILED DESCRIPTION OF THE PREFERRED EMBODIMENTS

Hereinafter, catalyst for a partial oxidation reforming reaction of fuel, and fuel reforming apparatus and method using the same according to the invention will be described in detail.

In the following descriptions, the term of "a supply line of air alone or mixed gas of air and fuel" is meant that air alone or mixed gas of air and fuel can be supplied through the supply line.

Firstly, the catalyst for a partial oxidation reforming reaction of fuel according to the invention has a body having a predetermined shape with through-hole so that reforming gas may pass through the hole.

The shaped catalyst having the through-hole is preferably shaped into a disk-shape (Especially a flat disk-shape having through-hole in the center of the disk or a doughnut shape; Regarding the thickness of the disk, there is no limitation of the thickness and various thickness are formable). The diskshaped catalyst having through-hole therein is suitable for a partial oxidation reforming reaction of fuel because the diskshaped form of catalyst having a through-hole therein makes it possible to spread out the reforming gas (fuel and air) radially and uniformly on the surface of the catalyst or the stack of the catalyst after the reforming gas passes through the through-hole, and it is possible to minimize variation of gas pressure and to prevent the hot spots in the catalyst (Especially, the efficiency of preventing the hot spots becomes to higher when using porous nickel for the doughnut-shaped catalyst according to the invention). Accordingly, it is possible to improve a fuel reforming efficiency. However, it should be noted that the form of the disk-shaped catalyst is not limited to a circle.

Hereinafter, a manufacturing process of the disk-shaped catalyst is described as an embodiment of the invention.

At first, a main body of the catalyst is manufactured, cut into a disk-shape and then perforated to have a through-hole in a center thereof.

Then, the shaped main body of the catalyst having a diskshape formed with a through-hole is completed in a manner of repeatedly coating an active component and/or cocatalyst to the shaped body.

For example, as the main body of the catalyst, porous Ni-10 wt % Cr and Ni-5 wt % Al plates can be used. Further, ceria is usually used as the active component and cocatalyst for a combustion reaction may be used. Herein, for example, only a very small amount of platinum (refer to Example 2) is sufficient as the cocatalyst.

According to the invention, the catalyst can be manufactured without using the active material and/or cocatalyst. For example, the catalyst can be manufactured just using porous Ni-based alloy.

The fuel reforming apparatus using the catalyst according to the invention comprises a fuel reforming reactor, igniter, and a gas supply line. Also, the fuel reforming reactor have the catalyst mounted therein.

The fuel reforming reactor made of, for example, stainless steel comprises one shaped catalyst or more shaped catalysts stacked therein (i.e., a stack of the catalyst), and the support necessary for supporting the catalyst or the stack of the catalyst in the reactor. Therefore, the fuel reforming reactor becomes to have simple construction.

Further, a metal screen such as inconel screen can be inserted between the stack of the catalyst, so that a passage, through which reforming gas can pass while contacting with the layers of catalyst, is provided.

A member for preventing a reverse progress of spark or flame when the reaction occurs can be mounted to an upstream part of the fuel reforming reactor. For example, a metal fiber mat is used as the member.

The igniter is for generating electric spark in the interior of the through-hole of the catalyst. For example, the igniter is an electrode extending from the inside to the outside of the fuel reforming reactor, the electrode is connected to an electric accumulation device in the outside of the fuel reforming reactor and an end of the electrode which is inserted into the through-hole is provided with an electric spark-generating part.

The gas supply line is for supplying fuel and air to an interior of the through-hole of the catalyst or the stack of the catalyst. Herein, the gas supply line comprises a fuel supply line and a supply line for supplying air alone or mixed gas of air and fuel. Further, the fuel supply line and the supply line for supplying air alone or mixed gas of air and fuel are independently formed from each other. To this end, when starting the reforming apparatus, the fuel and the air are not mixed with each other during the supplying process until they are mixed in the interior of the through-hole.

Meanwhile, only the supply line for supplying the mixed gas of fuel and air may be provided to the reactor without the fuel supply line, as necessary. To this end, it is possible to provide the simpler reforming apparatus.

According to the invention, the electrode may be surrounded by an insulator so that electric spark is generated in the interior of the through-hole of the catalyst or the stack of the catalyst mounted in the reactor. Herein, the fuel supply line may be formed so as to be inside of the insulator, and the supply line for supplying air alone or mixed gas of air and fuel may be formed so at to be outside of the insulator. To this end, it is possible to prevent the fuel and the air from being mixed in starting time, as described above.

In the above-described apparatus, when the igniter becomes to be ignited and then a combustion reaction of fuel occurs in the interior of the through-hole, it is possible to increase the catalyst to an operational temperature by combustion heat.

Meanwhile, in the fuel reforming apparatus according to the invention, a heat exchanger is provided at an outlet, so that produced gas discharged from the outlet is heat-exchanged with reforming gas supplied into the fuel reforming reactor, thereby preheating the reforming gas before the reforming gas is supplied into the reactor.

In the fuel reforming method according to the invention, a catalyst or a stack of the catalyst, the catalyst being in the form of disk having through-hole, is provided in the reforming apparatus (S1).

Then, fuel and air are supplied into the through-hole. Herein, the air is firstly supplied, and then the fuel is supplied not to be mixed with the air. The fuel and the air are mixed in the interior of the through-hole in which electric spark is generated (S2).

Then, a reforming apparatus is started by generating electric spark in the through-hole using an electric accumulation device (S3).

Then, when the reforming apparatus reaches a reforming condition, (i.e., the catalyst or the stack of the catalyst reaches proper temperature for partial oxidation reforming reaction of fuel), fuel and air is mixed and then supplied to the reactor so as to perform a fuel reforming reaction (S4).

Meanwhile, the reforming gas of the air and the fuel may be preheated by heat exchanging with produced gas discharged (S5). The reforming gas of the air and the fuel can be humidified by an external humidifier to prevent carbon deposition inside the catalyst or the stack of the catalyst.

According to the invention, it is possible to easily make a combustion reaction at room temperature by generating the spark at the interior of the stack of catalysts. In addition, since the ignition is accomplished by using the electric accumulation device, an electric supply from the outside is not necessary. Accordingly, it is possible to greatly shorten the start-up time just using the minimum amount of electricity.

To this end, according to the fuel reforming apparatus of the invention, it is possible to greatly shorten the start-up time and the reforming gas is used directly for combustion reaction as well as partial oxidation reforming reaction. Accordingly, the apparatus is particularly suitable for a system or equipment required for a small-sized apparatus.

EXAMPLE 1

Preparation of Catalyst

In the Example 1, in order to prepare the catalyst according to the invention, a porous Ni-10 wt % Cr plate was prepared.

At first, a main body of the catalyst prepared by tape-casting the Ni—Cr slurry and then sintering it in a reducing atmosphere at 1000° C. for 30 minutes was cut into a disk-shape. The disk-shaped Ni-10 wt % Cr plate has porosity of 50-70% and pore size of 3-10 micrometer. Then, the disk-shaped main body of the catalyst was perforated to have a through-hole in a center (i.e., doughnut-shape), which plays a role of a passage of reforming gas. An active component and cocatalyst were then coated to the disk-shaped main body of the catalyst.

A main active component was ceria and a very small amount of platinum was used as the cocatalyst for a combustion reaction.

Figure 1:
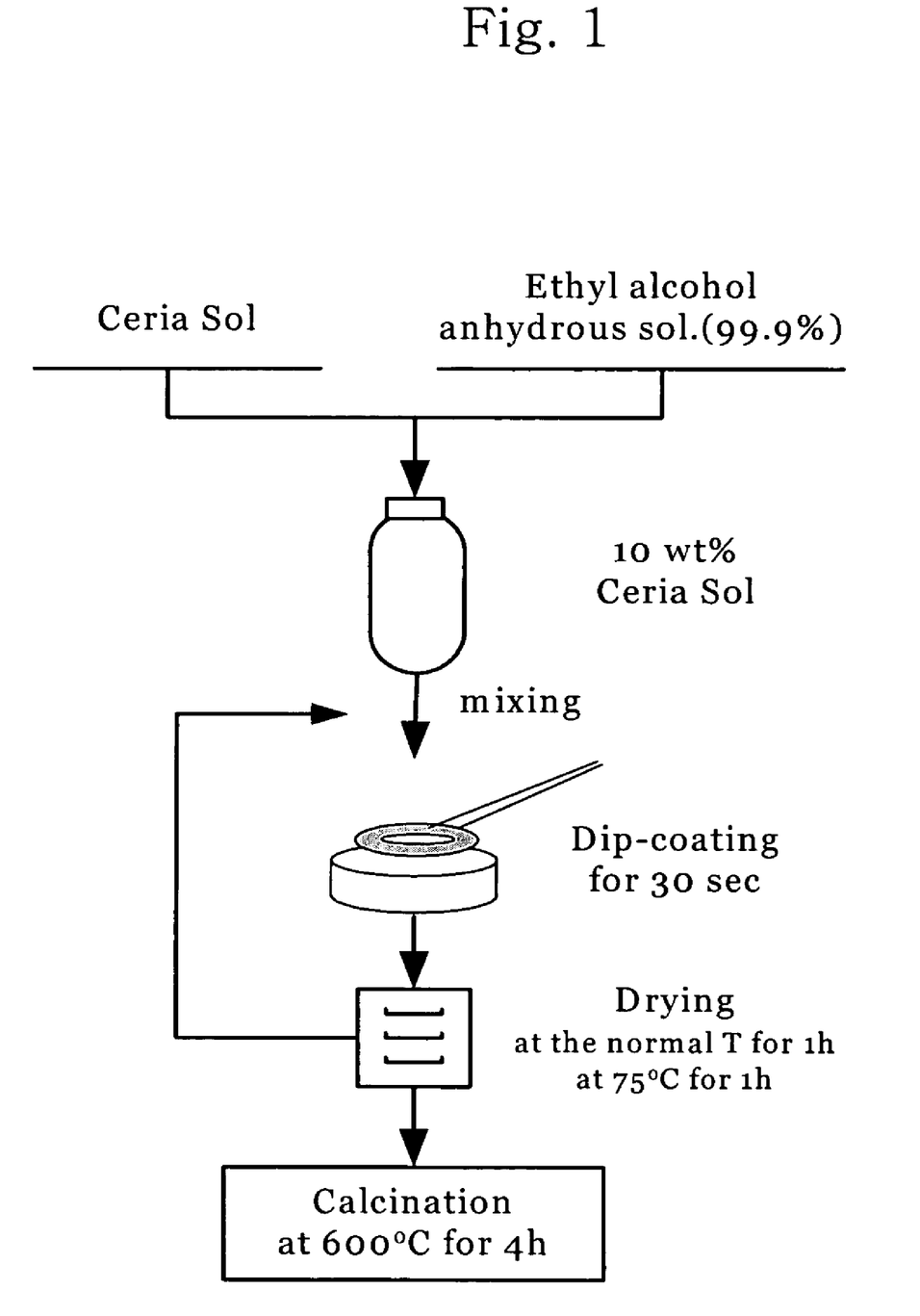
FIG. 1 is a schematic view showing a procedure of washcoating an active component to a disc-shaped catalyst having a through-hole according to the invention.

FIG. 1 is a schematic view showing a procedure of wash-coating the active component to the disk-shaped main body of the catalyst having a through-hole.

As shown in FIG. 1, as a catalyst wash-coating solution, ceria sol (reagent: cerium oxide, 20% in $H_2O$, 0.01~0.02 micron particle, Alfa Aesar) and ethyl alcohol anhydrous solution (99.9%) were mixed in a weight ratio of 1:1 (In FIG. 1, since the ceria sol reagent and the ethyl alcohol anhydrous solution were mixed in a weight ratio of 1:1, it was indicated as 10 wt % ceria sol).

The disk-shaped main body of the catalyst having the through-hole was sequentially wetted in a catalyst wash-coating solution for 30 sec., taken out and dried at room temperature for 1 hour and at 70° C. for 1 hour.

The coating amount of ceria was variously controlled by repeating the above procedure several times.

After the controlled amount of ceria was wash-coated, the catalyst was subject to calcination in a nitrogen atmosphere at 600° C. for 4 hours. A very small amount of platinum was then wash-coated once (there was little change of weight after wash-coating) in the same manner as described above, thereby preparing a disk-shaped catalyst having through-hole.

Due to a shape of the reforming apparatus of the invention, the platinum exhibited a combustion characteristic only with a very small amount and was suitable for the starting of the reforming reaction.

Finally, the catalyst was again subject to calcination in a nitrogen atmosphere at 600° C. for 4 hours.

EXAMPLE 2

Structure and Starting Characteristics of a Reforming Apparatus

This Example 2 relates to a fuel reforming apparatus according to the invention and an evaluation of starting characteristics thereof.

Figure 2:
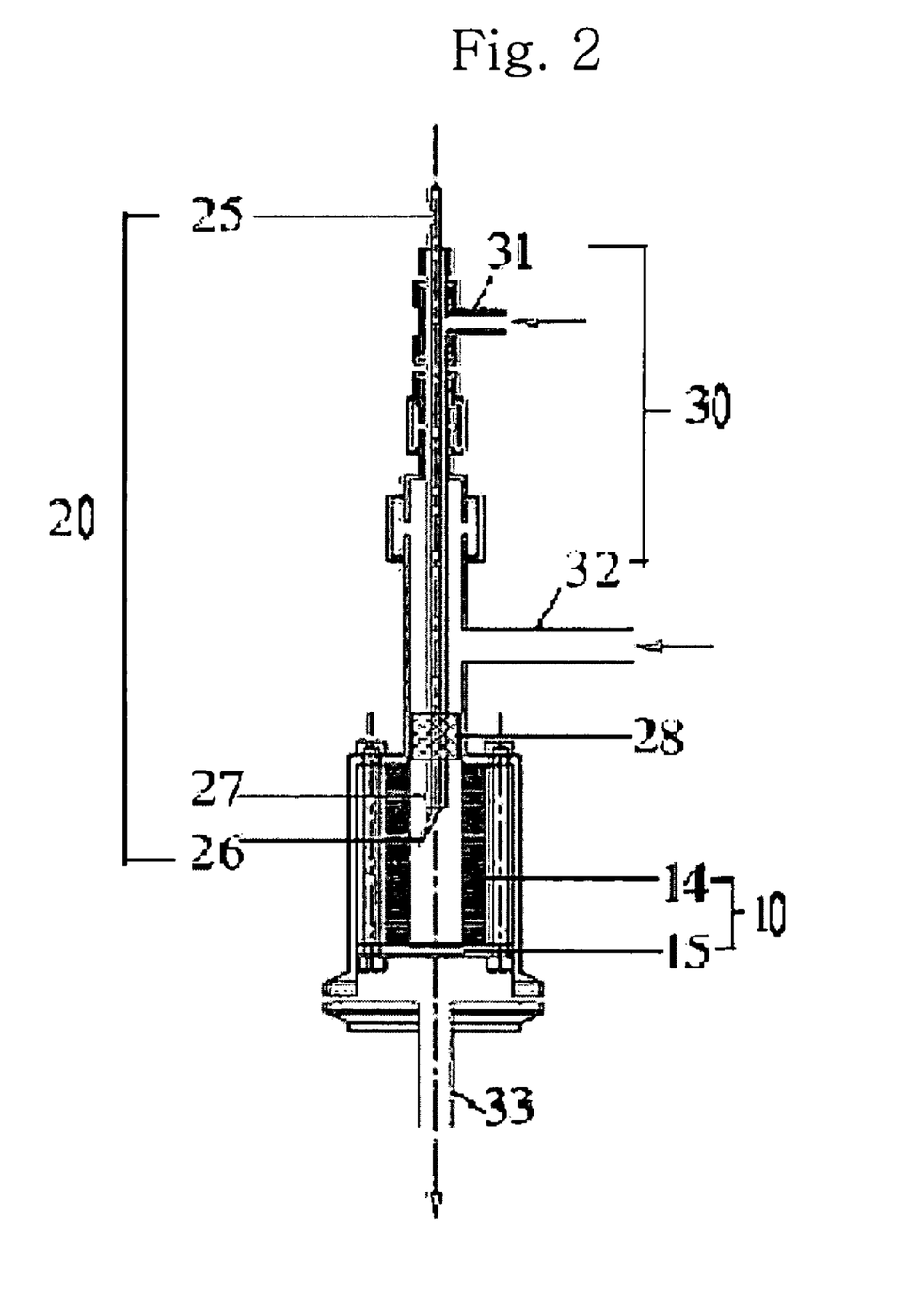
FIG. 2 is a schematic sectional view showing a fuel reforming apparatus according to the invention.

FIG. 2 is a schematic sectional view showing a fuel reforming apparatus.

As shown in FIG. 2, the fuel reforming apparatus comprises a fuel reforming reactor 10, an igniter 20 and a gas supply line 30.

The catalyst was directly charged in the fuel reforming reactor 10 by stacking the catalyst 14 in the form of disk having through-hole as many as necessary in the fuel reforming reactor 10, so that the reforming reactor became compact.

Further, an inconel screen was inserted between the catalyst 14 to provide a passage so that a reforming gas can pass through while contacting the layers of catalyst.

The igniter 20 for starting the reforming reactor is an electrode 25 extending from the inside to the outside of the fuel reforming reactor 10. An end of the electrode 25 is provided with an electric spark-generating part 26 which is inserted into the through-hole.

The electrode 25 is connected to an electric accumulation device (not shown) in the outside of the fuel reforming reactor 10. The electric accumulation device is grounded to the electrode 25 in the outside of the fuel reforming apparatus 10 made of stainless steel. When turning on the electric accumulation device, the electric spark is generated at the interior of the through-hole of the catalyst, so that reforming fuel is ignited and thus a combustion reaction proceeds.

In addition, the electrode 25 is insulated by an insulator 27 surrounding the electrode and generates the electric spark in the through-hole of the stack of catalysts charged in the reactor 10.

The gas supply line 30 is for supplying the air and the fuel to increase the layers of catalyst to an operational temperature. The air is supplied to the interior of the stack of the catalysts via a supply line 32 for supplying air alone or mixed gas of air and fuel, and reforming fuel (methane, propane, etc.) is supplied via a fuel supply line 31 which is different from the supply line 32.

At this time, the fuel supply line 31 is structured to pass through the insulator 27. Accordingly, the fuel which is supplied at the early state of the starting can be supplied to the interior of the stack of the catalysts without being mixed with the air.

That is, firstly, after supplying the air into the through-hole of the catalyst, the fuel is supplied via the fuel supply line 31 not to be mixed with the air. The supplied fuel is then mixed with the air at the interior of the layers of catalyst and a spark is generated from the electric spark-generating part 26, thereby causing a combustion reaction of fuel.

At this time, a metal fiber mat 28 is provided to an upstream part of the fuel reforming reactor 10 in order to prevent back propagation of the spark or flame.

The gas generated after the combustion reaction is exhausted to the outside via an exhaust gas line 33.

Figure 3:
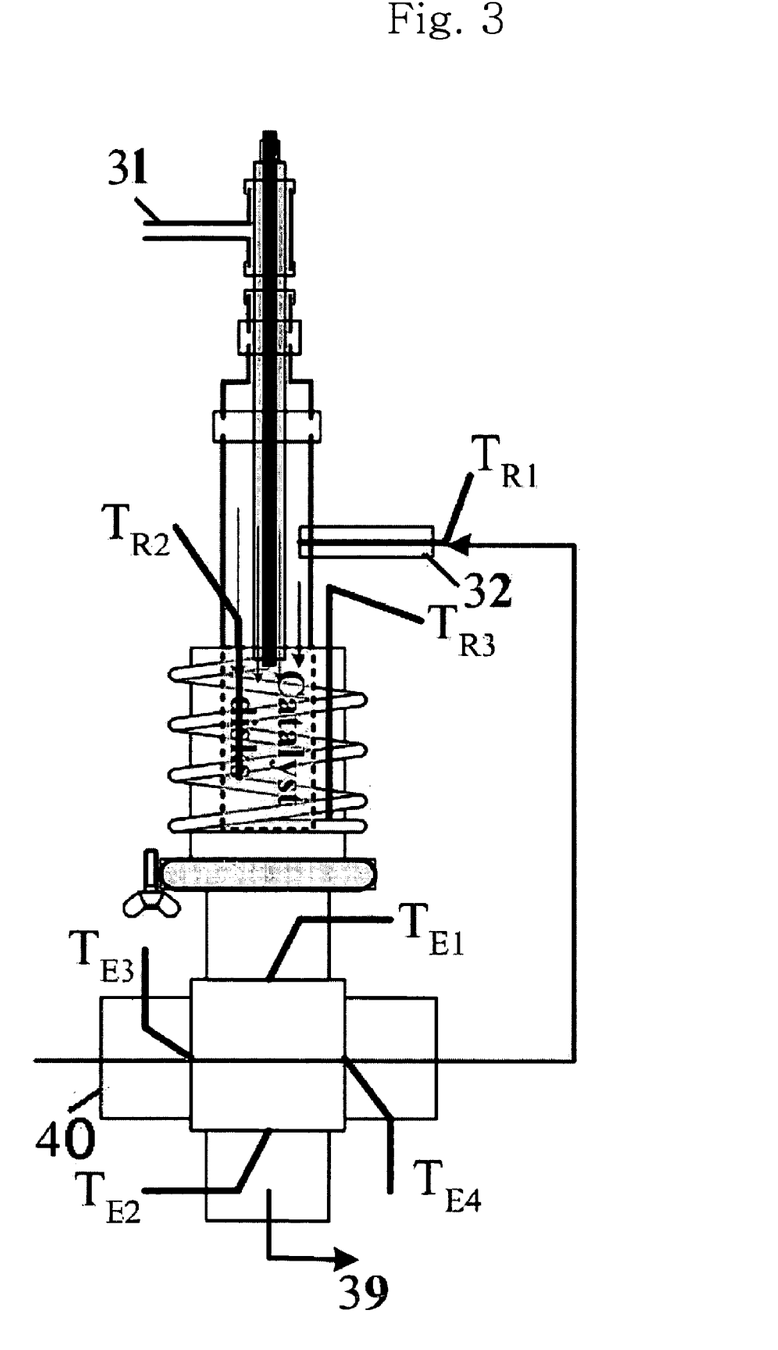
FIG. 3 is a schematic view showing a fuel reforming apparatus, wherein a heat exchanger is mounted to the apparatus according to the invention.

FIG. 3 is a schematic view showing a fuel reforming apparatus, wherein a heat exchanger is mounted to the apparatus.

As shown in FIG. 3, a heat exchanger 40 is mounted to an outlet of the fuel reforming reactor, so that it preheats a reforming gas introduced into the reforming reactor by using heat carried by produced gas which is discharged at high temperature.

That is, heat exchange occurs between the produced gas being exhausted from the reformer and the reforming gas introduced to the reformer so that heat corresponding to $T_{E1}$-$T_{E2}$ in the produced gas 39 exhausted becomes close to heat corresponding to $T_{E4}$-$T_{E3}$ in the reforming gas introduced into the reactor.

As described hereinafter, when a temperature of the stack of catalysts increases to a level, in which a reforming operation is possible, in 1~2 minutes by using combustion heat of the reforming fuel, the supply of the reforming fuel is slowly changed from the fuel supply line 31 to the supply line 32 for supplying mixed gas of air and fuel, so that the reforming gas of the fuel and air is sufficiently mixed, supplied to the stack of catalysts via the supply line 32 and preheated in the heat exchanger 40 before the supply. The reforming gas of the air and the fuel can be humidified by an external humidifier to prevent carbon deposition inside the catalyst or the stack of the catalyst.

Figure 4:
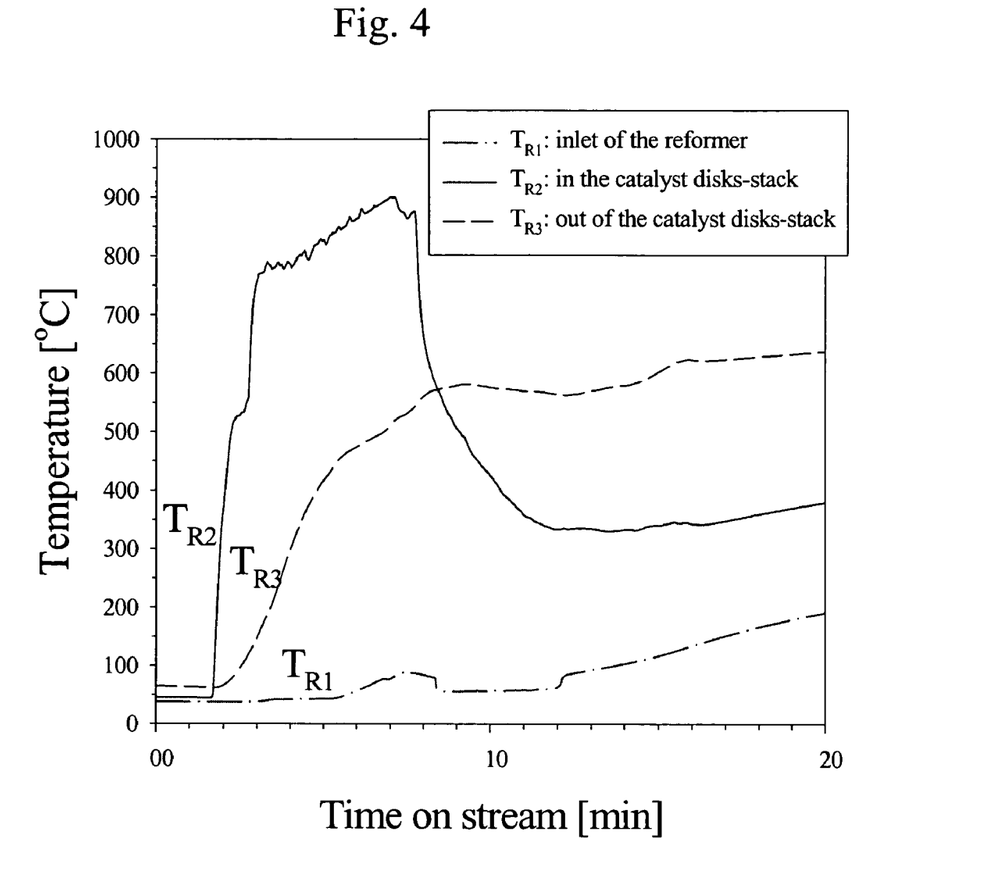
FIG. 4 is a graph showing a temperature variation according to time (start-up characteristic) in the reforming reactor in Example 2.

FIG. 4 is a graph showing a temperature variation according to time (start-up characteristic) in the reforming reactor in Example 2.

As shown in FIG. 4, when the fuel reforming apparatus is started, temperature around the through-hole of the disk-shaped catalyst can be increased to 800° C. in 1~2 minutes and the outside thereof is also increased to 500° C. in less than 10 minutes. Accordingly, the operation is possible on an operational condition that oxygen-reforming reaction (partial oxidation reaction) occurs.

In addition, pressure is little applied to the air supply line 32 in spite of rapid combustion reaction. When operating on a 1.5 kW fuel reforming system condition, it was shown that 0.15 kgf/cm$^2$ of pressure was applied. Additionally, it could be known that since the temperature of the layers of catalyst for igniting the reforming fuel is about 500° C., there is no danger of an explosion.

[Experiment: Performance Evaluation of the Reforming Apparatus]

In this experiment, the apparatus was used and the operational characteristics were measured when LPG (propane, $C_3H_8$) was used as fuel. Meanwhile, when LNG (methane, $CH_4$) was used as fuel, similar operational characteristics were also exhibited as those of this experiment.

To examine operational characteristics regarding a reforming reaction of propane, performance of the reforming system was compared while changing ratios of steam/carbon and oxygen/carbon and while fixing the ratios of steam/carbon and oxygen/carbon and changing flow rate of the reforming gas.

Among the results, Table 1 shows a comparison result of compositions of produced gases according to supply rates of the reforming gas when the ratios of steam/carbon and oxygen/carbon were respectively fixed to 0.5 and 1.0. Herein, $O_2$ of the air was used as $O_2$ and steam was supplied to prevent a caulking.

TABLE 1

|  |  | 2.82 | 9.18 | 13.86 |
|---|---|---|---|---|
| C$_3$H$_8$ [L/min] | | | | |
| Product distribution (%) | H$_2$ | 32.1 | 30.3 | 29.4 |
| | CO | 16.4 | 16.4 | 16.7 |
| | CO$_2$ | 4.4 | 6.5 | 5.1 |
| | N$_2$ | 46.0 | 46.8 | 48.8 |
| (H$_2$ + CO) flow rate [L/min.] | | 16.8 | 51.9 | 73.7 |

As shown in Table 1, when the propane was supplied in an amount of 9.18 L/min., syn-gas (H$_2$+CO) which can be used as fuel for high-temperature fuel cell was produced in at a rate of 51.9 L/min and conversion rate of the propane was 99% or more. Meanwhile, when supply rates of the propane were 2.82 and 13.86 L/min., the operational characteristics were also similar to the preceding results.

As described above, the catalyst for a partial oxidation reforming reaction of fuel according to the invention makes it possible to smoothly progress the partial oxidation reforming reaction of fuel, to minimize the variation of gas pressure and to prevent the hot spots in the catalyst. Accordingly, it is possible to improve the efficiency when reforming the fuel and to simplify the fuel reforming reactor.

According to the fuel reforming apparatus and method using the catalyst, since the heat of reaction is efficiently controlled and used, a simple on-off operation, reduction of starting time and a stable operational condition are accomplished, which are indispensably required for a fuel reforming system, such as household, portable and car fuel cells.

Particularly, according to the catalyst, apparatus and method of the invention, since the combustion heat increases the temperature of the catalyst by burning the reforming fuel in the through-hole of the catalyst, the starting time is shortened and thus the operation of the reforming system is possible in 1~2 minutes.

Further, according to the catalyst, apparatus and method of the invention, it is possible to simplify the structure of the fuel reforming reactor. In addition, effective operational characteristics can be obtained by using LPG (propane) or LNG (methane) as fuel of the fuel reforming system.

What is claimed is:

1. A fuel reforming method comprising the steps of:
    providing a catalyst or a stack of the catalyst to a fuel reforming reactor, the catalyst being in the form of disk having a perforated through-hole (S1);
    separately supplying fuel and air into the perforated through-hole so that the fuel and air are not mixed with each other (S2);
    starting a fuel reforming reaction in the reactor by generating electric spark in the perforated through-hole (S3); and
    carrying out the fuel reforming reaction by supplying the reforming gas of fuel and air to the catalyst or the stack of the catalyst in the reactor when the fuel reforming reaction reaches a fuel reforming condition (S4).

2. The method according to claim 1, wherein, in the step of S2, the fuel is supplied after the supply of air so that the fuel and air are not mixed together before supplying into the perforated through-hole, the fuel and the air are being mixed in the perforated through-hole in which the electric spark is generated.

3. The method according to claim 2, wherein, in the step of S3, the electric spark is generated in the perforated through-hole using an electric accumulation device.

4. The method according to claim 3, wherein, in the step of S4, the reforming gas of fuel and air are spread out from the interior of the perforated through-hole to the exterior of the perforated through-hole, and radially spread out on the surface of the catalyst or the stack of the catalyst.

5. The method according to claim 1, wherein the method further comprises preheating the reforming gas, which is supplied when the fuel reforming reaction occurs, through a heat exchange with produced gases discharged (S5).

6. The method of claim 1, wherein, in the step of S1, a screen is inserted between the stack of the catalyst.

* * * * *